May 5, 1964
D. W. KELBEL
3,131,582
TRANSMISSION MECHANISM
Filed Feb. 20, 1961
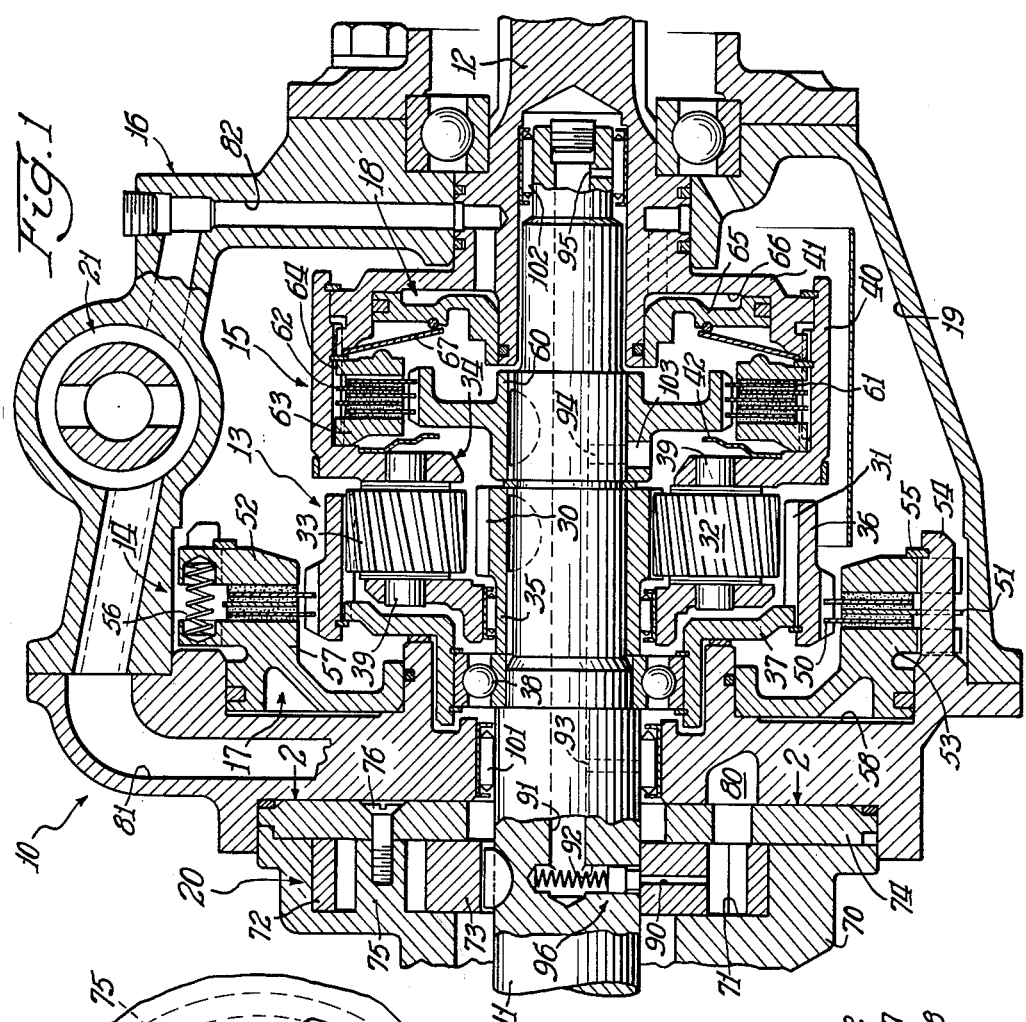
Inventor:
Donald W. Kelbel
By: Ray E. Snyder Atty.

United States Patent Office 3,131,582
Patented May 5, 1964

3,131,582
TRANSMISSION MECHANISM
Donald W. Kelbel, Muncie, Ind., assignor to Borg-Warner Corporation, Chicago, Ill., a corporation of Illinois
Filed Feb. 20, 1961, Ser. No. 90,342
2 Claims. (Cl. 74—788)

This invention relates to a hydraulic forward-reverse type transmission mechanism adapted to be used in marine and industrial applications.

It is an object of the present invention to provide an improved hydraulic transmission mechanism comprising a duplex planetary gear set, a fluid pressure actuated clutch for completing a direct drive power train through the transmission and a disc-type brake adapted to render effective a reverse drive power train through the transmission.

It is another object to provide an improved hydraulic transmission comprising a planetary gear set, a fluid pressure actuated clutch for completing a direct drive power train through the transmission, a fluid pressure operated brake for rendering effective a reverse drive power train through the transmission, a gear type pump for supplying fluid pressure for actuating the brake and clutch, and additional means utilizing the output of said pump for lubricating the planetary gear set and the bearings of the transmission.

It is a more particular object to provide a transmission of the type described and including a pump of the internal-external gear type, the external gear being keyed to and driven by a rotatable shaft and the shaft being formed with a longitudinal bore and with a plurality of radial bores, one bore registering with a radial bore through the external pump gear and effective to supply lubricating fluid through the longitudinal bore for lubricating the rotating parts of the transmission.

It is a still more partciular object to provide novel lubricating means as described in the preceding object and including check valve means in the radial bore for permitting the passage of fluid into the longitudinal bore during a portion of each revolution of the input shaft, and effective to block the passage of fluid from the longitudinal bore back into the pump during the remainder of each revolution.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIG. 1 is a longitudinal sectional view of the improved transmission mechanism of the present invention and including a fluid pump;

FIG. 2 is a view taken on line 2—2 of FIG. 1, showing an axial view of the pump and FIG. 3 is an enlarged fragmentary sectional view of the check valve mounted in the input shaft of the transmission.

Like characters of reference designate like parts in the several views.

Referring to FIG. 1, the transmission mechanism of the present invention is designated generally by the numeral 10 and comprises an input shaft 11, an output shaft 12, a duplex planetary gear set 13, a disc-type brake 14, and a multiple disc clutch 15, all contained within a casing or housing 16. The transmission mechanism 10 also includes a fluid pressure actuated servomotor 17 for engaging the brake 14, a fluid pressure actuated servomotor 18 for engaging the clutch 15, and a fluid sump or reservoir 19 formed on the bottom interior of the casing 16. A gear pump 20 is mounted on the front of the casing 16 and is adpted to be driven by the input shaft 11. The pump 20 draws fluid from the sump 19 and supplies fluid under pressure to a rotatable manual selector valve 21 which directs the fluid pressure to one or the other of the servomotors 17 or 18.

The input shaft 11 is connected to be driven by an engine (not shown) and the output shaft 12 is connected to a propeller shaft (not shown).

The planetary gear set 13 comprises a sun gear 30, a ring gear 31, a plurality of planet gears 32 and 33, and a planet gear carrier 34. The sun gear 30 is formed on a sleeve 35 which is keyed to the input shaft 11. The ring gear 31 is formed on the interior of a drum or shell 36 which is splined to an annular flange 37 which is supported by a bearing 38 on the input shaft 11. The planet gears 32 and 33 are in mesh with each other and are rotatably carried on shafts 39 mounted on the planet gear carrier 34. The planet gears 32 are in mesh with the sun gear 30 and the gears 33 are in mesh with the ring gear 31. The planet gear carrier 34 is formed integrally with a drum 40 which is splined to a flared annular portion 41 of the output shaft 12. The planet gear carrier 34 carries an oil collector ring or shroud 42 which directs lubricating fluid to the planetary gear set 13, as will be described hereinafter.

The brake 14 comprises friction discs 50 and 51, a fixed pressure plate 52 and a movable pressure plate 53. The friction discs 50 are splined to the exterior of the drum 36 and are interleaved with the friction discs 51 which are splined to an annular portion 54 of the casing 16. The fixed pressure plate 52 is attached to the annular portion 54 by means of a snap ring 55 and the movable pressure plate 54 is biased toward a disengaged condition by a plurality of springs 56 disposed between the pressure plates 52 and 53. The servomotor 17 for actuating the brake 14 comprises an annular piston 57 slidably disposed within an annular cavity 58 and which is formed integrally with the movable pressure plate 53.

The clutch 15 comprises an annular hub 60 keyed to the input shaft 11, a plurality of friction discs 61 and 62, a fixed end pressure plate 63 and a movable pressure plate 64. The friction discs 61 are splined to the exterior of the hub 60 and are interleaved with the friction discs 62 which are splined to the interior of the drum 40. This discs 61 and 62 are sandwiched between the fixed pressure plate 63 and the movable pressure plate 64 which are also splined to the interior of the drum 40.

The servomotor 18 for engaging the clutch 15 comprises an annular piston 65 slidably disposed within an annular cavity 66 formed in the output shaft 12 and a Belleville-type spring washer 67. The washer 67 is disposed between the piston 65 and the movable pressure plate 64 and acts as a lever in pressing the clutch 15 into engagement and acts as a return spring for the piston 65 when the clutch is disengaged.

The pump 20 comprises a casing portion 70 attached to the casing 16 and formed with an internal cylindrical cavity 71, an internal gear 72 rotatably disposed in the cavity 71, an external gear 73 also disposed in the cavity 71 and keyed to the input shaft 11, and an indexing plate 74 sandwiched between the casing portion 70 and the casing 16. The gears 72 and 73 are separated by a crescent-shaped barrier portion 75 on one side and are in mesh with each other at a point radially opposite from the barrier portion 75. The crescent 75 is attached to the indexing plate 74 by means of a machine screw 76.

The indexing plate 74 is formed with elongated ports 77 and 78 therethrough. When the direction of rotation is in the direction shown by the numeral 79 of FIG. 2, the port 77 is an inlet port and the port 78 is an outlet port. The pump 20 is adaptable for the opposite direction of rotation by shifting the position of the indexing plate 74 with respect to the casing 16 and thereby interchanging the inlet and outlet ports.

The inlet port 77 registers with an inlet conduit 80 formed in the casing 16, and the outlet port 78 discharges fluid into an outlet conduit 81 also formed in the casing 16. The inlet conduit 80 is connected to the sump 19 and the outlet conduit 81 is connected to the selector valve 21. The selector valve 21 may be of the type shown in my Patent No. 2,877,668, issued March 17, 1959. The valve 21 is selectively rotatable to direct fluid through a conduit 82 to the servomotor 18, or through another conduit (not shown) to the servomotor 17.

The pump gear 73 is formed with a radial bore or channel 90 of relatively small diameter through which lubricating fluid is directed to the input shaft 11. The input shaft 11 is formed with a longitudinal bore 91 and a plurality of radial bores 92, 93, 94, and 95, all opening into the bore 91. A check valve 96 is disposed in the bore 92 which is in register with the bore 90. The check valve 96 comprises a retaining cup 97, a ball valve 98 and a spring 99. The cup 97 is press fitted into the bore 92 and is formed with a shoulder 100 of reduced diameter against which the ball valve 98 is adapted to seat. The radial bores 93 and 95 are in communication with bearings 101 and 102, respectively, and are adapted to supply lubricating fluid to these bearings. The bore 94 is in register with a port 103 formed through the hub 60 and is adapted to supply lubricating fluid to the collector ring 42 for lubricating the planetary gear set 13.

*Operation*

When the input shaft 11 is being driven by the engine, the sun gear 30 of the planetary gear set 13 is driven at the same speed, and the pump 20 supplies fluid pressure through conduit 81 to the manual selector valve 21. For forward drive condition, the manual selector valve 21 is turned to a position effective to direct fluid from conduit 81 to the servomotor 18 for engaging the clutch 15. The engaged clutch 15 effectively locks together the input shaft 11 and the output shaft 12 for thereby completing a direct drive ratio through the transmission.

For reverse drive condition, the manual selector valve 21 is turned to a position effective to direct fluid pressure to the servomotor 17 for engaging the brake 14. The engaged brake 14 tends to hold stationary the ring gear 31 so that it serves as a reaction member for the planetary gear set 13. The sun gear 30 drives the planet gears 32, which in turn, drive the planet gears 33 so as to cause them to walk around the interior of the stationary ring gear 31. The planet gear carrier 34 is caused to rotate in the opposite direction by the planet gears 32 and 33 and drives the output shaft 12 in the reverse direction.

The pump 20 is also effective to supply lubricating fluid for lubricating the rotating parts of the transmission during each rotation of the input shaft 11. Fluid pressure developed at the outlet port 78 of the pump 20 is effective to force a portion of the fluid through the bore 90 and check valve 96 into the longitudinal bore 91 of the input shaft 11. Th portion of each rotation of the input shaft during which fluid pressure is thus supplied is indicated approximately by the angle on FIG. 2. During the remainder of each rotation, the spring 99 is effective to cause the valve 96 to close and thereby prevent the passage of fluid from the bore 91 back into the pump 20 when the bore 90 is in communication with the inlet port 77.

The pump 20 thus is effective to supply lubricating fluid into the bore 91 during a portion of each revolution of the input shaft 11. The lubricating fluid within the bore 91 flows through the bores 93 and 95 for lubricating the bearings 101 and 102, respectively, and through the bores 94 and 103 for lubricating the planetary gear set 13. Fluid passing through the bores 94 and 103 is caught by the collector ring 42 and is directed under the influence of centrifugal force through the planet gears 32 and 33.

There has been described by this invention, an improved hydraulic transmission mechanism of the forward-reverse type including a fluid gear pump and novel lubricating means effective to supply lubricating fluid to the rotating parts of the transmission during a portion of each revolution of the input shaft.

The lubricating means has been described in connection with a gear pump of the internal-external type. It should be understood that the lubricating means could be employed equally well with other types of gear pumps where one gear is keyed to the input shaft.

The amount of lubricating fluid supplied is determined by the diameter of the bore 90 and the opening pressure of the check valve 96. Depending upon the capacity of the pump 20, the bore 90 should be of a size large enough to supply adequate lubricating fluid, but small enough so as not to drop the output pressure significantly.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. In a transmission mechanism comprising an input shaft and an output shaft, planetary gearing and a plurality of selectively engageable friction elements for providing a plurality of drive ratios through the transmission, a fluid pressure actuated servomotor for each of said friction engaging elements, and a source of fluid pressure for supplying fluid to said servomotors, and for lubricating the transmission, said source comprising a pump having a rotatable pumping element connected to said input shaft, means defining a lubricating path through said input shaft, and means defining a single radial bore of relatively small diameter through said pumping element for supplying fluid for lubrication under pressure into said lubricating path so as to utilize only a portion of the output of said pump for lubrication and thereby prevent any significant drop in the pressure of the fluid supplied to said servomotor.

2. In a lubrication system for a transmission mechanism having an input shaft and an output shaft and planetary gearing and fluid pressure actuated brakes and clutches for completing driving gear ratios between the shafts, the combination of a pump comprising a plurality of gears adapted to supply fluid pressure to said friction engaging elements with one of said gears being connected to said input shaft, means defining a longitudinal bore and a plurality of radial bores formed in said input shaft, means defining a radial bore of relatively small diameter formed through said one pump gear and registering with one radial bore in said input shaft, a check valve disposed in said one radial bore, means defining a fluid inlet port for said pump, and means defining a fluid outlet port for said pump, said pump being effective to supply fluid for lubrication under pressure through said radial bore and through said check valve when said bore is in communication with said outlet port so as to utilize only a portion of the output of said pump for lubricating purposes, and said check valve being effective to block the passage of fluid pressure through said radial bore when it is in communication with said fluid inlet port.

References Cited in the file of this patent

UNITED STATES PATENTS

| | | |
|---|---|---|
| 2,011,338 | Hill | Aug. 13, 1935 |
| 2,115,987 | Dodge et al. | May 3, 1938 |
| 2,274,836 | Koster | Mar. 3, 1942 |
| 2,521,239 | McDowall et al. | Sept. 5, 1950 |
| 2,877,668 | Kelbel | Mar. 17, 1959 |
| 2,968,190 | Orr | Jan. 17, 1961 |

FOREIGN PATENTS

| | | |
|---|---|---|
| 562,282 | France | Aug. 31, 1923 |